United States Patent [19]

Grube et al.

[11] Patent Number: 4,726,462

[45] Date of Patent: Feb. 23, 1988

[54] CODING DEVICE FOR CONVEYING SYSTEMS

[75] Inventors: Erwin Grube; Gerhard Schilling, both of Bielefeld, Fed. Rep. of Germany

[73] Assignee: Dürkoppwerke GmbH, Bielefeld, Fed. Rep. of Germany

[21] Appl. No.: 846,113

[22] Filed: Mar. 31, 1986

[30] Foreign Application Priority Data

May 30, 1985 [DE] Fed. Rep. of Germany ....... 3519312

[51] Int. Cl.$^4$ ............................................. B65G 47/48
[52] U.S. Cl. .................................... 198/349; 198/379; 104/88; 209/583
[58] Field of Search ............... 198/349, 350, 351, 352, 198/354, 465.4, 379, 394, 572; 104/88, 127, 128, 110, 250, 252; 209/583, 552, 569

[56] References Cited

U.S. PATENT DOCUMENTS

| 2,941,666 | 6/1960 | Sims, Jr. | 209/538 X |
| 3,592,141 | 7/1971 | Davidson | 104/88 |
| 3,738,475 | 6/1973 | Lee et al. | 198/350 |
| 3,938,653 | 2/1976 | Senger | 198/379 X |
| 4,018,410 | 4/1977 | Renaux | 104/88 X |
| 4,114,538 | 9/1978 | Nicodemus, Jr. et al. | 104/88 |
| 4,567,988 | 2/1986 | Weibel | 209/583 X |
| 4,597,495 | 7/1986 | Knosby | 198/349 X |

FOREIGN PATENT DOCUMENTS 2429160 6/1987 Fed. Rep. of Germany .

Primary Examiner—Randolph A. Reese
Assistant Examiner—Peter M. Cuomo
Attorney, Agent, or Firm—Oblon, Fisher, Spivak, McClelland & Maier

[57] ABSTRACT

A coding device for conveying systems comprises code carriers in connection with individual conveying units (30,32) of the conveying system and at least one reading device (48) which is arranged at the conveying track of the conveying system. The code carriers are constructed as rotatable discs (30), and a driving device (50) for rotating the discs during the reading process is provided in connection with the reading device (48).

9 Claims, 6 Drawing Figures

CODING DEVICE FOR CONVEYING SYSTEMS

FIELD OF THE INVENTION

The invention relates to a coding device for conveying systems, comprising code carriers in connection with the individual conveying units of the conveying system and at least one reading device which is arranged at the conveying track of the conveying system.

BACKGROUND OF THE INVENTION

The increasing use of electronic data processing systems in industrial plants increasingly leads to the automation of plant-internal conveying processes. In this connection, material-flow systems are frequently controlled with the aid of code markings on individual conveying units of the system and reading devices for identifying the individual conveying units and for distributing the conveying units to the desired target positions. Whilst the selection of suitable optical, magnetic or mechanical coding marks presents no problems in most cases, the reading of the coding marks and the reliable recognition of the different bit patterns is problematic because of the continuous movement of the material-flow systems and the necessarily relatively short time available for the reading.

As a code, the so-called bar code is frequently used which can be automatically read with the aid of a laser scanner. Laser scanners having a moving scanning beam provide the possibility of multiple scanning of the coding marks which is important for the reliable recognition of the bit patterns. Although this is a relatively reliable reading method, experience shows that the error rate is relatively great, at least in the case of moving objects. In addition, for economic reasons it is not possible, as a rule, to equip conveying systems with laser scanners of this type because of the relatively high cost.

Considerably less expenditure is required if lasers with a fixed scanning beam are used which, however, must be passed several times to and fro over the code marking to achieve reliable recognition. This would also require an oscillating movement of the reading device, which presupposes a high constructional effort. In practice, it is impossible to achieve the necessary uniform sequence of motion within a specified time pattern at always the same distance from the code to be read. Problems would also be found with respect to control engineering since, with an oscillating sequence of motion, it must be possible to interpret the code both in the forward and in the reverse direction. A suggestion in the case of conveying systems is therefore to oscillate, not the reading device, but the individual conveying units with the code marking. However, this is disadvantageous in most cases because of the forces of mass inertia to be overcome.

OBJECT OF THE INVENTION

The invention is based on the object of creating a coding device for conveying systems which, in a constructionally relatively simple manner, provides the possibility of repeated reading of a coding marking applied to a conveying unit and, as a result, guarantees reliable recognition of the bit patterns.

SUMMARY OF THE INVENTION

According to the invention, the foregoing object is achieved by the facts that the code carriers are constructed as rotatable discs and that, in connection with the reading device, a driving device for rotating the discs is provided.

Instead of the oscillating movement, which is disadvantageous for various reasons, of the reading device or of the code marking, the code marking is rotated with respect to the reading device. The marking is located in a circular track which is scanned by the reading device. The movement of rotation of the code carrier can be constructionally realised in a simple manner and also with a speed which can be relatively arcuately maintained.

The roll are preferably used directly as code carriers in a conveyor whose conveying units run on rails with the aid of rollers.

The code can be applied to a side face or also to the periphery of a running roller. The running roller runs from the rail of the system on to a driving drum and is accurately fixed in this position by a guide roller.

BRIEF DESCRIPTION OF THE DRAWINGS

In the text which follows, preferred illustrative embodiments of the invention are explained in greater detail with the aid of the attached drawing, in which.

DETAILED DESCRIPTION OF THE PRESENTLY PREFERRED EMBODIMENTS

Figure 1:
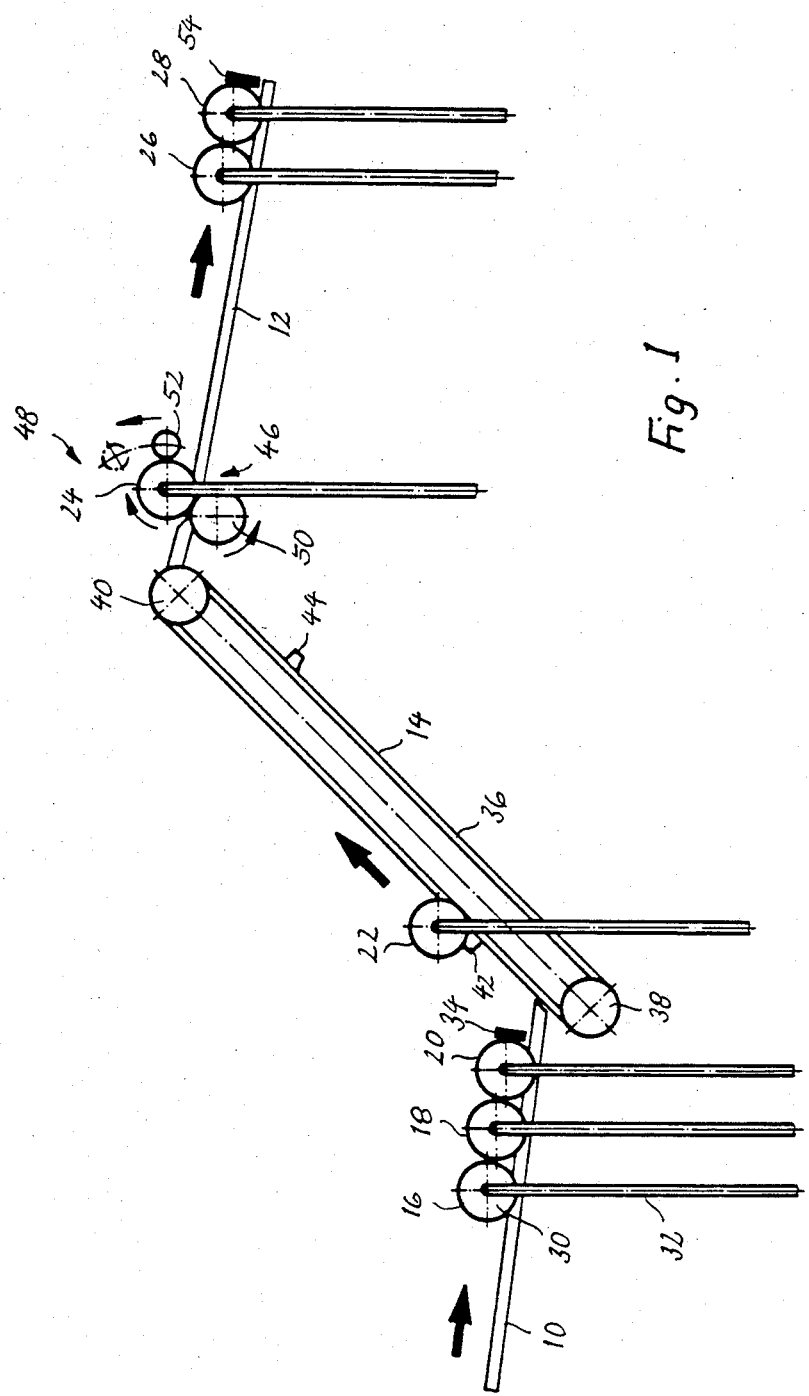
FIG. 1 is a diagrammatic side view of a part section of a conveying system according to the invention.

FIG. 1 shows two rail sections 10, 12 of a conveying system, which are connected by an interposed lift conveyor 14 which raises the conveying units to the higher level of the rail section 12. In the example shown, it is a conveyor in which the individual conveying units are formed by conveyor carriers 16, 18, 20, 22, 24, 26, 28 which freely roll down the rail sections 10, 12, inclined in the direction of conveying, with the aid of running rollers 30. The running rollers 30 carry hoops 32 which are used, for example, for accepting items of clothing in a textile plant. To compensate for the loss of height of the conveyor carriers resulting from the inclination of the rail sections 10, 12, lift conveyors 14 are needed at suitable positions for recovering the height.

In the example shown in accordance with FIG. 1, the conveyor carriers 16, 18, 20 are stopped at the end of the first rail section 10 by a stop 34 by means of which the conveyor carriers are individually released. After having been released, the rollers 30 of the conveyor carriers 16, 18, 20 reach the area of the lift conveyor 14 which comprises an endless conveying belt 36 which runs around two deflection rollers 38, 40 in an obliquely inclined path and has two lifters 42, 44 on the outer surface in diametrically opposite positions which are used for engaging the rollers 30 of the conveyor carrier as is shown in FIG. 1 in the example of he conveyor carrier 22.

The lift conveyor 14 hands the individual conveyor carriers over to the second, higher rail section 12 which has in its starting area an interruption 46 in which a reading device 48 according to the invention is provided. In the interruption or the gap in the rail section 12, a driving drum 50 is located which has a horizontal axis of rotation which extends transversely to the conveying direction and which is to be occasionally rotated in the direction of the arrow shown by a driving motor (not shown). Downstream of the interruption 46 in the rail section 12, a horizontal guide roller 52 is located the axis of which is directed transversely to the rail section 12 and which guide roller acts as a stop and holds the running roller 30 of the conveyor carrier 24 shown in FIG. 1 in the position of the reading device, in such a manner that the running roller 30 is located on the driving drum 50 and can be rotated by the latter in the direction of the arrow. As will be explained later in greater detail, a code marking is located on the running roller 30 which is read during this rotary movement. After completion of the reading process, the guide roller 52 is pivoted on a swivel arm (not shown) into the position shown with a dot and dash line, above the running roller 30, so that the running roller 30 is released and the conveyor carrier can roll down to the right on the rail section 12. At the end of the second rail section 12, a further stop 54 is shown which, in turn, provides a possibility of individual onward guidance of the conveyor carriers.

Figure 2:
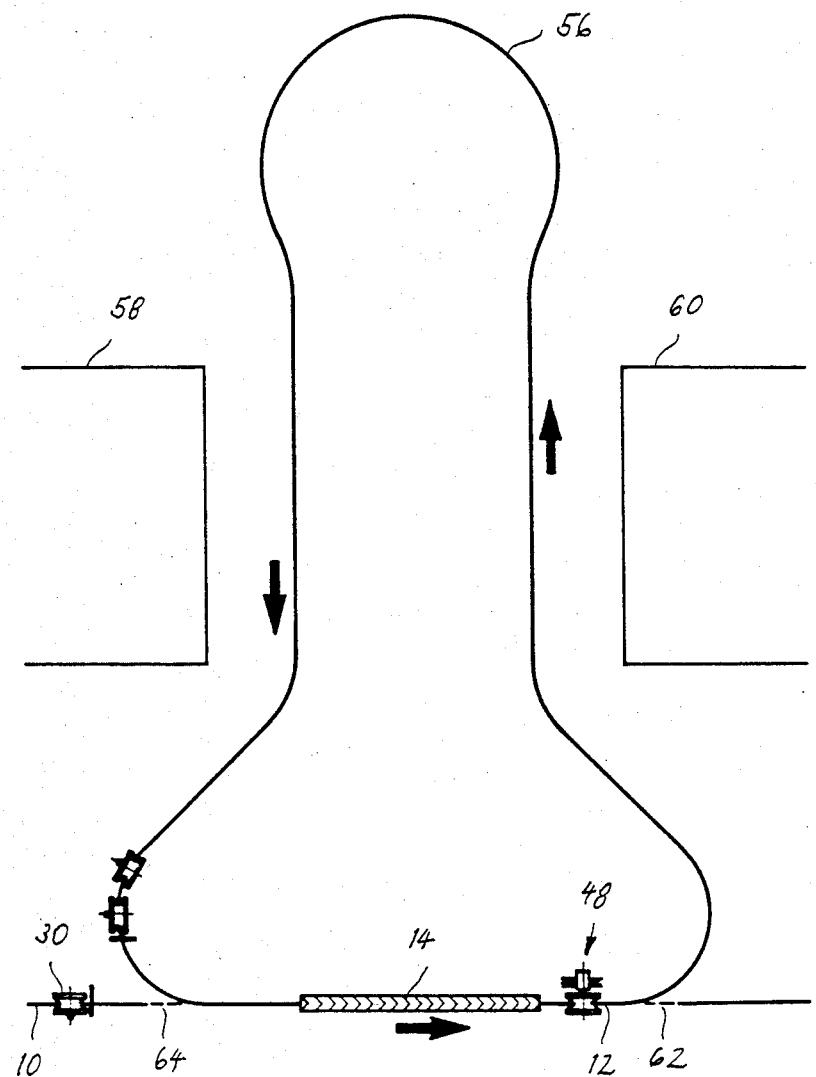
FIG. 2 shows a diagrammatic top view of the track layout of a conveying system according to the invention.

FIG. 2 shows the processes as described above in a wider-ranging connection in a simplified top view. A conveying loop 56 which is used, for example, for supplying two work stations 58, 60 branches off from the main conveying section formed by the rail sections 10, 12. The individual conveyor carriers can be introduced into the conveying loop 56 with the aid of a switch 62 downstream of the lift conveyor 14 and the reading device 48 and can be conducted back into the lift conveying section via a switch 64 in a position in front of the lift conveyor 14. In this arrangement, the switches 62, 64 are controlled, for example, in accordance with the read result of the reading device 48. As in FIG. 1, the directions of movement are obvious from the arrows specified in the drawings.

Figure 3:
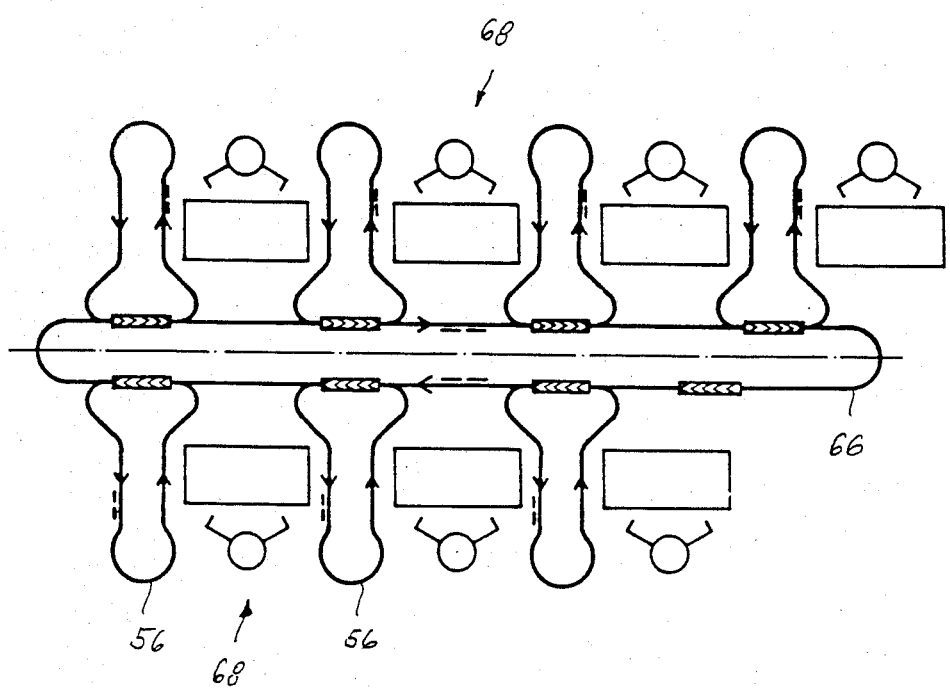
FIG. 3 is a diagrammatic representation of a conveying system according to the invention in connection with a number of work stations.

In FIG. 3, several conveying loops 56 according to FIG. 2 are connected to a main conveying section 66 in a corresponding representation which, however, is further reduced in scale. The conveying loops 56 are in each case associated with work stations 68. In front of each work station 68 the code of the conveyor carriers can be read (in each case in the manner already described), so that each conveyor carrier automatically reaches its appropriate work station. At the same time, the possibility exists of registering the position of each individual conveyor carrier, to give priority to express orders and the like with the aid of a suitable data processing system.

Figure 4:
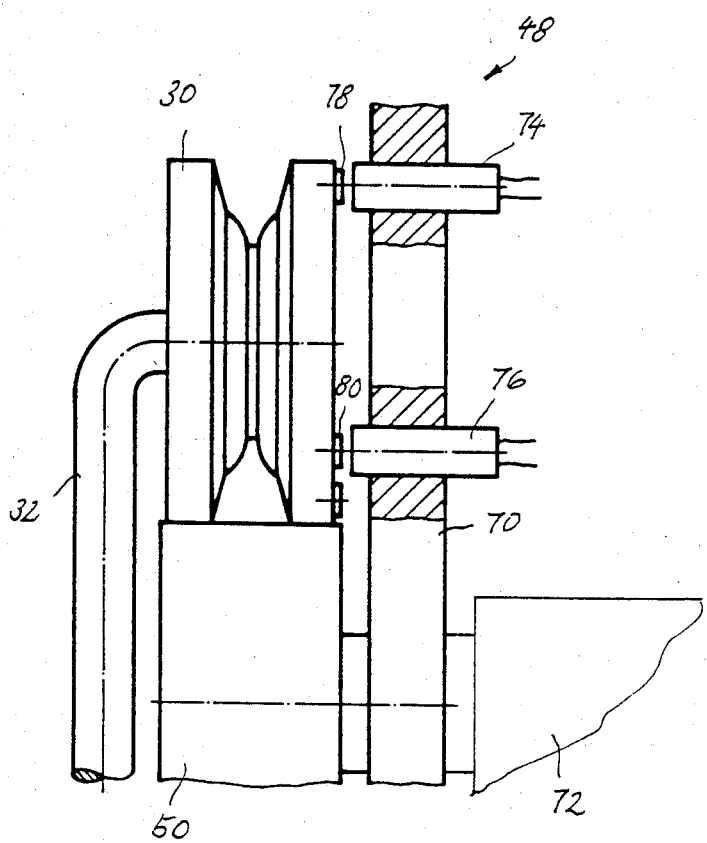
FIG. 4 is a part view of a code carrier and of a reading device.

FIG. 4 shows at a scale which is enlarged with respect to the preceding representations a running roller 30 of a conveyor carrier in its position on the driving drum 50 of the reading device 48. In the position of the reading device 48, a vertical carrier plate 70 is located on the side of the conveying track, in which plate the driving drum 50 is supported and at the rear of which a driving motor 72 of the driving drum 50 is located. In addition, two detectors 74, 76 are inserted into unmarked holes in the carrier plate 70, which detectors scan, by optical, magnetic or mechanical methods, code markings 78, 80 on the end face of the running roller 30 facing the detectors 74, 76 and pass corresponding signals to an associated data processing system.

Figure 5:
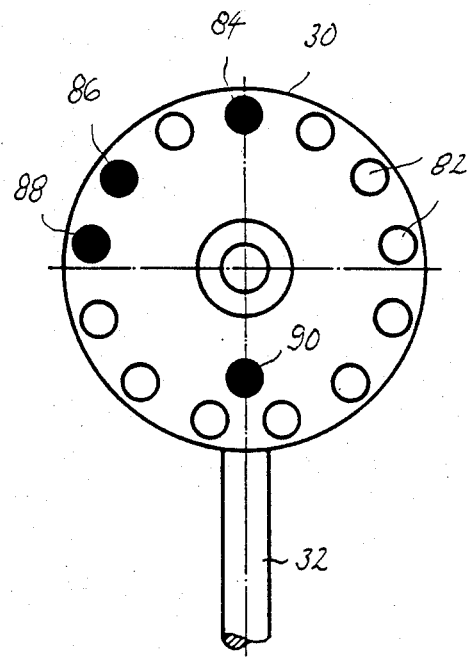
FIG. 5 is a view of the code carrier according to FIG. 4 from the right-hand side in FIG. 4.

As can be seen from FIG. 5, holes 82 are located in a concentric circle on the end face of the running roller 30, into which holes coding pins 84, 86, 88 are inserted in selected positions and in a selected number. By selecting the number of holes 82, a suitable number of possible combinations can be established. On a circle located farther inwards, a coding pin 90 is located in a corresponding arrangement which establishes the beginning of the sequence of code markings to be read and is detected by the second detector 76.

In the case of magnetic scanning of the code described above, the coding pins can consist, for example, of metal and the running rollers, in contrast, of plastic. Instead of this relatively simple code, the familiar bar code can also be used for identification.

Figure 6:
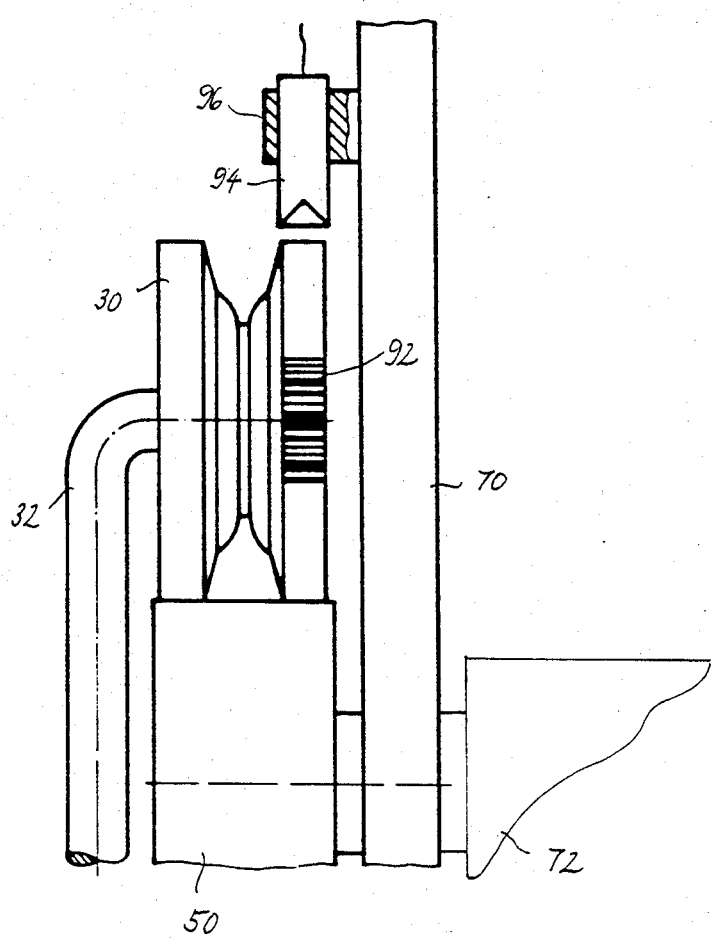
FIG. 6 shows another embodiment of a code and reading system.

According to FIG. 6, a bar code 92 is applied to the periphery of the running roller 30. The bar code 92 can be scanned, for example, by a laser scanner 94 which is directed onto the periphery of the running roller 30 and which is mounted at the front of the carrier plate 70 above the running roller 30 with the aid of a projection 96.

Using the driving drum 50, the respective code can be relatively rapidly and repeatedly moved past the associated detector or scanner. This rotary movement can be advantageously generated with a speed which can be relatively accurately determined, for example by using a synchronous electric motor. As soon as the code has been reliably read, the reading device can emit a signal for releasing the respective conveyor carrier.

Overall, the reading device according to the invention can be constructed to be very compact and does not require any complicated driving mechanisms for oscillating the code or the reading device. The total reading process proceeds very precisely and with extreme rapidity and does not represent a significant impediment within a conveying process which is continuous overall.

What is claimed is:
1. A conveying system comprising:
    (a) a plurality of movable conveyor carriers, each one of said plurality of movable conveyor carriers comprising at least one rotatable disk;
    (b) code markings located on the rotatable disks associated with at least some of said plurality of movable conveyor carriers;
    (c) at least one reading device capable of reading said code markings on said rotatable disks as said rotatable disks are rotated;
    (d) first means for bringing said plurality of movable conveyor carriers into propinquity with said at least one reading device; and
    (e) second means for rotating said at least one rotatable disk on each one of said plurality of movable conveyor carriers while said each one of said plurality of movable conveyor carriers is located in propinquity to said at least one reading device.

2. A conveying system as recited in claim 1 wherein said plurality of movable conveyor carriers is movable on a rail.

3. A conveying system as recited in claim 2 wherein each one of said plurality of movable conveyor carriers comprises at least one running roller that rotates on said rail.

4. A conveying system as recited in claim 3 wherein said at least one running roller on each one of said plurality of movable conveyor carriers is said at least one rotatable disk.

5. A conveying system as recited in claim 1 wherein said second means comprises a driving drum that operatively engages said at least one rotatable disk on each one of said plurality of movable conveyor carriers when said each one of said plurality of movable conveyor carriers is located in propinquity to said at least one reading device.

6. A conveying system as recited in claim 5 and further comprising third means for temporarily holding each one of said plurality of movable conveyor carriers so that the associated one of said rotatable disks is in operative engagement with said driving drum.

7. A conveying system as recited in claim 1 wherein each one of said rotatable disks has a circumferential periphery and at least one side face.

8. A conveying system as recited in claim 7 wherein said code markings are provided on said circumferential peripheries of said rotatable disk.

9. A conveying system as recited in claim 7 wherein said code markings are provided on said at least one side face of said rotatable disks.

* * * * *